US010877888B2

(12) United States Patent
Kaushikkar et al.

(10) Patent No.: US 10,877,888 B2
(45) Date of Patent: Dec. 29, 2020

(54) SYSTEMS AND METHODS FOR PROVIDING DISTRIBUTED GLOBAL ORDERING

(71) Applicant: Apple Inc., Cupertino, CA (US)

(72) Inventors: Harshavardhan Kaushikkar, San Jose, CA (US); Sridhar Kotha, San Jose, CA (US); Srinivasa Rangan Sridharan, San Jose, CA (US); Xiaoming Wang, Sunnyvale, CA (US); Yu Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 16/125,494

(22) Filed: Sep. 7, 2018

(65) Prior Publication Data
US 2020/0081837 A1    Mar. 12, 2020

(51) Int. Cl.
*G06F 12/08* (2016.01)
*G06F 12/0815* (2016.01)
*G06F 12/0855* (2016.01)

(52) U.S. Cl.
CPC ...... *G06F 12/0815* (2013.01); *G06F 12/0855* (2013.01); *G06F 2212/1008* (2013.01); *G06F 2212/608* (2013.01)

(58) Field of Classification Search
None
See application file for complete search history.

(56) References Cited

U.S. PATENT DOCUMENTS

| | | | |
|---|---|---|---|
| 5,751,986 A | 5/1998 | Fetterman et al. |
| 5,881,264 A | 3/1999 | Kurosawa |
| 6,334,172 B1 | 12/2001 | Arimilli et al. |
| 6,349,361 B1 | 2/2002 | Altman et al. |
| 6,701,416 B1 | 3/2004 | Arimilli et al. |
| 7,454,570 B2 | 11/2008 | Dunshea et al. |
| 7,627,721 B2 | 12/2009 | Hass |
| 7,805,392 B1 | 9/2010 | Steele et al. |
| 8,024,522 B1 | 9/2011 | Favor et al. |
| 8,762,951 B1 | 6/2014 | Kosche et al. |
| 9,213,652 B1 | 12/2015 | Miao et al. |
| 9,383,995 B2 | 7/2016 | Kanapathipillai et al. |
| 2002/0112129 A1 | 8/2002 | Arimilli et al. |

(Continued)

*Primary Examiner* — Tracy C. Chan
(74) *Attorney, Agent, or Firm* — Kowert Hood Munyon Rankin and Goetzel PC; Rory D. Rankin

(57) ABSTRACT

Systems, apparatuses, and methods for implementing a distributed global ordering point are disclosed. A system includes at least a communication fabric, sequencing logic, and a plurality of coherence point pipelines. Each coherence point pipeline receives transactions from the communication fabric and then performs coherence operations and a memory cache lookup for the received transactions. The global ordering point of the system is distributed across the outputs of the separate coherence point pipelines. Device-ordered transactions travelling upstream toward memory are assigned sequence numbers by the sequencing logic. The transactions are speculatively issued from the communication fabric to the coherence point pipelines. Speculatively issuing the transactions to the coherence point pipelines may cause the transactions to pass through the distributed global ordering point out of order. Control logic on the downstream path reorders the transactions based on the assigned sequence numbers.

20 Claims, 9 Drawing Sheets

(56) References Cited

U.S. PATENT DOCUMENTS

| | | |
|---|---|---|
| 2006/0218358 A1 | 9/2006 | Hofmann et al. |
| 2007/0195761 A1* | 8/2007 | Tatar ................... H04L 49/1546 370/389 |
| 2009/0138683 A1 | 5/2009 | Capps, Jr. et al. |
| 2010/0037027 A1 | 2/2010 | Prudvi et al. |
| 2012/0260042 A1 | 10/2012 | Henry et al. |
| 2012/0260071 A1 | 10/2012 | Henry et al. |
| 2012/0260074 A1 | 10/2012 | Henry et al. |
| 2014/0173342 A1* | 6/2014 | Kaushikkar ........... G06F 11/273 714/30 |
| 2014/0281190 A1* | 9/2014 | Kaushikkar ........... G06F 9/4411 711/105 |
| 2016/0092358 A1* | 3/2016 | Bair ...................... G06F 3/0604 711/141 |
| 2018/0300145 A1* | 10/2018 | Lauritzen .............. G06F 9/3851 |
| 2019/0130102 A1* | 5/2019 | Johnson .............. G06F 12/1027 |

* cited by examiner

SYSTEMS AND METHODS FOR PROVIDING DISTRIBUTED GLOBAL ORDERING

BACKGROUND

Technical Field

Embodiments described herein relate to computing systems, and more particularly, to implementing a distributed global ordering point.

Description of the Related Art

Integrated circuits (ICs) often include multiple circuits or agents that have a need to communicate with each other and/or access data stored in memory. In many cases, agents may communicate through various addresses defined in a common memory map or address space. In multiprocessor ICs, and even in single processor ICs in which other devices access main memory but do not access a given cache, the issue of cache coherence arises. That is, a given data producer can write a copy of data in the cache, and the update to main memory's copy is delayed. In write-through caches, a write operation is dispatched to memory in response to the write to the cache line, but the write is delayed in time. In a writeback cache, writes are made in the cache and not reflected in memory until the updated cache block is replaced in the cache (and is written back to main memory in response to the replacement).

Because the updates have not been made to main memory at the time the updates are made in a cache, a given data consumer can read the copy of data in main memory and obtain "stale" data (data that has not yet been updated). A cached copy in a cache other than the one to which a data producer is coupled can also have stale data. Additionally, if multiple data producers are writing the same memory locations, different data consumers could observe the writes in different orders.

Cache coherence solves these problems by ensuring that various copies of the same data (from the same memory location) can be maintained while avoiding "stale data", and by establishing a "global" order of reads/writes to the memory locations by different producers/consumers. If a read follows a write in the global order, the data read reflects the write. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state in which the cache is responsible for providing the data for a request (either by writing back to main memory before the data is provided to the requestor, or by directly providing the data to the requester), but there may be other copies in other caches. Maintaining cache coherence is increasingly challenging as different agents are accessing the same regions of memory.

Besides maintaining cache coherence, systems also try to ensure the order of transactions which are performed to memory and/or devices. To maintain the order of transactions, systems typically have what is called a global ordering point. A "global ordering point" is the point in the memory subsystem beyond which all operations are ordered with respect to each other. However, not all of the traffic which traverses the fabric and/or memory system has the same requirements with respect to maintaining order. Some traffic is device ordered traffic, which refers to transactions which need to be committed to their endpoint in the same order in which they were issued by their source. Other traffic is relaxed ordered, which refers to transactions which do not require an older transaction to finish ahead of a younger transaction. However, if there are two operations in a relaxed ordered stream that are going to the same address, then the ordering between the two operations to the same address needs to be maintained.

As transactions move through the system, they often traverse a communication fabric on their way upstream to memory or on their way downstream to a device. It is noted that the terms "communication fabric" and "fabric" may be used interchangeably herein. Many communication fabrics use a system of interconnected fabric units to arbitrate, aggregate, and/or route packets of messages between different processing elements. For example, some fabrics may use a hierarchical tree structure and process messages at each level in the tree. The processing performed at each level may include arbitration among packets from different processing elements, aggregating of packets belonging to the same message, operations to maintain memory coherence, etc. Communications fabrics are often used in system-on-a-chip (SoC) designs that are found in mobile devices such as cellular phones, wearable devices, etc., where performance is an important design concern.

SUMMARY

Systems, apparatuses, and methods for implementing a distributed global ordering point are contemplated.

In one embodiment, a system includes at least a communication fabric, sequencing logic, and a plurality of coherence point pipelines. Each coherence point pipeline performs coherence operations and a memory cache lookup for transactions issued by the communication fabric. In one embodiment, the global ordering point of the system is distributed across the outputs of the separate coherence point pipelines. Device-ordered transactions travelling upstream toward memory are assigned sequence numbers by the sequencing logic. The transactions are speculatively issued from the communication fabric to the coherence point pipelines. Speculatively issuing the transactions to the coherence point pipelines may cause the transactions to pass through the distributed global ordering point out of order. Control logic on the downstream path reorders the transactions based on the assigned sequence numbers.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
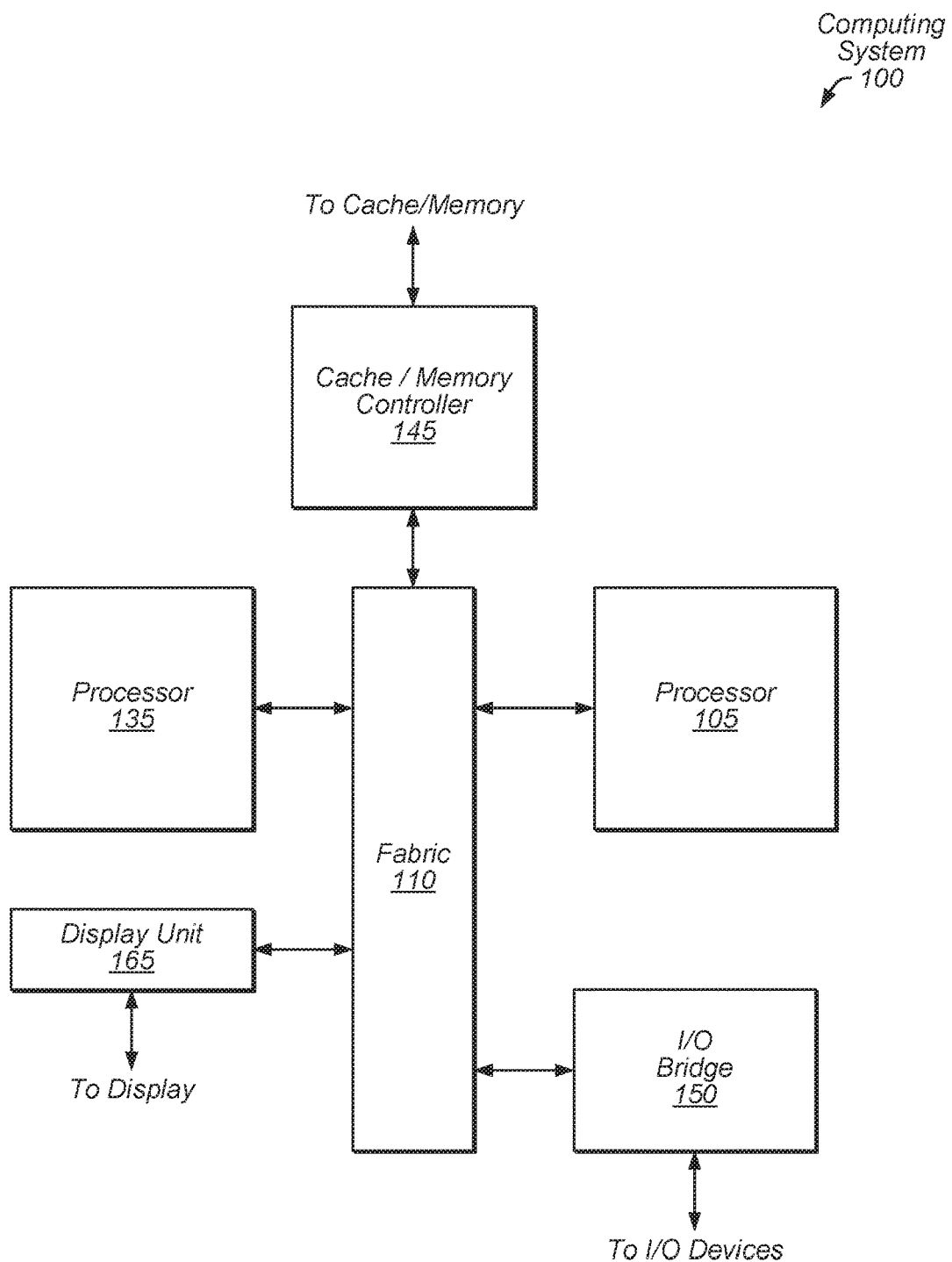
FIG. 1 is a block diagram illustrating one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology

The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a communication fabric . . . ." Such a claim does not foreclose the system from including additional components (e.g., a processor, a display, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

As used herein, a "transaction" refers to a command or request to read, write, or modify content (e.g., data or instructions) stored in a memory or device location corresponding to a particular address. In various embodiments, the address may be provided as a logical address, a physical address, or either. It is noted that throughout this disclosure, transactions may also be referred to as "requests", "memory requests", "memory access operations", or "memory operations", which are a type of instruction operation. In various embodiments, memory operations may be implicitly specified by an instruction having a memory operation, or may be derived from explicit load/store instructions.

As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Referring now to FIG. 1, a block diagram illustrating one embodiment of a computing system 100. In some embodiments, some or all elements of the computing system 100 may be included within an integrated circuit (IC) or a system on a chip (SoC). In some embodiments, computing system 100 may be included in a mobile device. In the illustrated embodiment, the computing system 100 includes fabric 110, processors 105 and 135, input/output (I/O) bridge 150, cache/memory controller 145, and display unit 165.

Fabric 110 may include various interconnects, buses, MUXes, controllers, etc., and may be configured to facilitate communication between various elements of computing system 100. In some embodiments, portions of fabric 110 may be configured to implement various different communication protocols. In other embodiments, fabric 110 may implement a single communication protocol and elements coupled to fabric 110 may convert from the single communication protocol to other communication protocols internally.

Depending on the embodiment, each of processors 105 and 135 may include various numbers of cores and/or caches. For example, processors 105 and 135 may include 1, 2, or 4 processor cores, or any other suitable number. In some embodiments, processors 105 and 135 may include internal instruction and/or data caches. Processors 105 and 135 are coupled to fabric 110, and processors 105 and 135 may access system memory via cache/memory controller 145. In one embodiment, processor 105 and 135 are coherent agents of system 100. In some embodiments, a coherence unit (not shown) in fabric 110 or elsewhere in computing system 100 may be configured to maintain coherence between various caches of computing system 100. Processors 105 and 135 are configured to execute instructions of a particular instruction set architecture (ISA), which may include operating system instructions and user application instructions.

Cache/memory controller 145 may be configured to manage transfer of data between fabric 110 and one or more caches and/or memories (e.g., non-transitory computer readable mediums). For example, cache/memory controller 145 may be coupled to an L3 cache, which may, in turn, be coupled to a system memory. In other embodiments, cache/memory controller 145 may be directly coupled to a memory. In some embodiments, the cache/memory controller 145 may include one or more internal caches.

Display unit 165 may be configured to read data from a frame buffer and provide a stream of pixel values for display. Display unit 165 may be configured as a display pipeline in some embodiments. Furthermore, display unit 165 may include one or more interfaces (e.g., MIPI® or embedded display port (eDP)) for coupling to a user display (e.g., a touchscreen or an external display). I/O bridge 150 may include various elements configured to implement universal serial bus (USB) communications, security, audio, low-power always-on functionality, and/or other functions. I/O bridge 150 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 100 via I/O bridge 150. In some embodiments, central processing unit 105 may be coupled to computing system 100 via I/O bridge 150.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
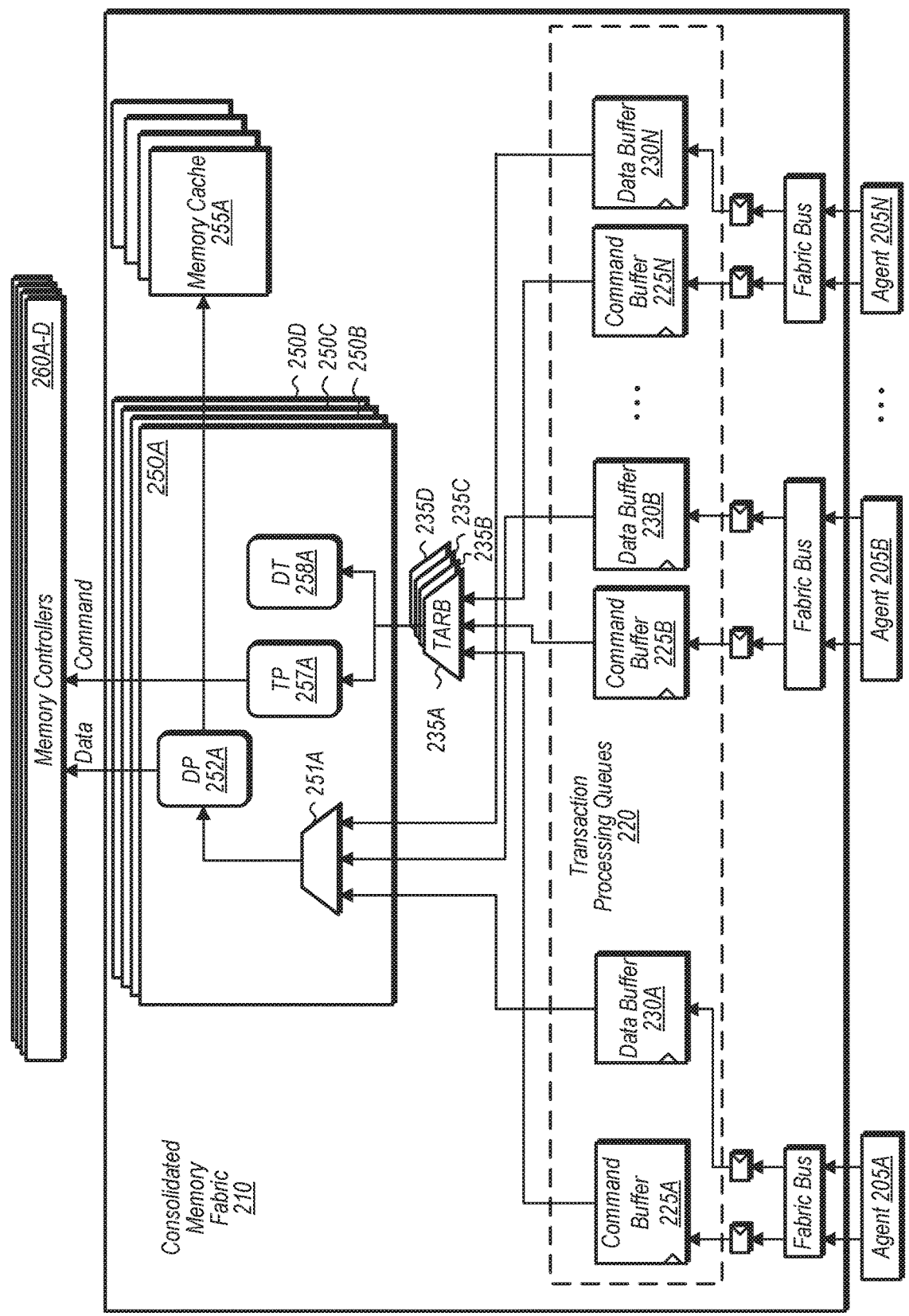
FIG. 2 is a block diagram of one embodiment of a consolidated memory fabric.

Turning now to FIG. 2, a block diagram of one embodiment of a consolidated memory fabric 210 is shown. In one embodiment, consolidated memory fabric 210 includes transaction processing queues 220, tag arbiters 235A-D, combined coherence point and memory cache controller units 250A-D, and memory caches 255A-D. Consolidated memory fabric 210 is coupled to agents 205A and memory controllers 260A-D. In other embodiments, consolidated memory fabric 210 includes other components and/or is arranged in other suitable manners. It is noted that "consolidated memory fabric" 210 may also be referred to as a "communication fabric" herein.

Agents 205A-N are representative of any number and type of agents. For example, in various embodiments, agents 205A-N include a CPU, a GPU, an I/O device, a system management unit, and/or other types of agents. Agents 205A-N send transactions upstream to memory through fabric bus components and flops to transaction processing queues 220. In one embodiment, there is a separate command buffer 225A-N and data buffer 230A-N pair for each agent 205A-N, respectively. In various embodiments, an entry in command buffers 225A-N may include a value representing a memory command, an address or addresses for the command (either logical or physical address), a value representing a priority of the transaction, a value representing an age or length of time since the transaction was issued, and/or any other suitable values that may be used in the processing of the transaction. When a write transaction is conveyed to one of transaction processing queues 220, the command and data payloads are written to a corresponding command and data buffer pair. When a read transaction is conveyed to one of transaction processing queues 220, the command payload is written to a given command buffer.

In one embodiment, the memory of the overall computing system is divided into multiple memory pipelines (i.e., multiple distinct processing paths) such that each has its own memory controller and can be accessed independently of other memories. For example, in one embodiment, each memory and corresponding memory pipeline may be assigned a portion of an address space. Alternatively, a memory and corresponding memory pipeline may be assigned data based on load balancing or other considerations. In one embodiment, the memory pipeline that a transaction traverses is selected based on a hash function applied to at least a portion of the transaction address. In such an embodiment, some form of mapping between memories and address hashes may be maintained. In the embodiment shown in FIG. 2, computing system 200 includes four pipelines 250A-250D. However, it should be understood that in other embodiments, computing system 200 may include other numbers of memory pipelines.

In one embodiment, consolidated memory fabric 210 includes a common arbitration point represented by tag arbiters 235A-D. For each pipeline, a given tag arbiter 235A-D selects a transaction from transaction processing queues 220 to forward to a corresponding combined coherence point and memory cache controller unit 250A-D. Each combined coherence point and memory cache controller unit 250A-D performs both coherence operations and memory cache lookups. For example, each of combined coherence point and memory cache controller unit 250A-D performs various operations so as to maintain memory coherence among various cache and/or memory structures of the overall computing system. As used herein, the term "coherence point" is intended to be construed according to its well-known meaning, which includes a processing element configured to maintain cache coherence between caches and/or memories in a shared memory system. As used herein, "coherence operations" are defined as performing lookups of a duplicate tag structure, generating and sending probes to one or more caches in the computer system to determine if the caches have a copy of a block of data and optionally to indicate the state into which the cache should place the block of data, processing responses to probes, and/or one or more other operations.

Some memory transactions may be fulfilled by accessing a main system memory or a storage device. In some computing systems, the amount of time required to read/write data from/to the main system memory or the storage device may be longer than an execution time of several processor instructions. To enable faster access to frequently accessed content, issued memory transactions are sent to a memory cache controller (e.g., combined coherence point and memory cache controller unit 250A-D) which may provide faster fulfillment of the memory transactions by storing content from frequently accessed memory locations in a memory cache 255A-D, respectively, that can be read and written faster than the main system memory or the storage device. After receiving a memory transaction, the memory cache controller determines if an address included in the memory transaction corresponds to an address currently stored in memory cache 255A-D. If the corresponding address for the memory transaction is currently stored in memory cache 255A-D, then the memory cache controller performs the transaction on a cached copy of requested content. Otherwise, if the address included in the memory transaction is not currently stored in memory cache 255A-D, then the memory cache controller issues a command to retrieve data at the address included in the memory command. This command is conveyed to a corresponding memory controller 260A-D. Memory controllers 260A-D are representative of any number of memory controllers which are connected to memory device(s) (not shown) via any number of memory channels.

Transaction processing queues 220 include any number of queues, with the number varying according to the embodiment. Each transaction processing queue 220 includes a command buffer 225A-N and data buffer 230A-N, respectively, with each buffer including a plurality of entries. As used herein, the term "queue" refers to a storage element having a plurality of entries. Queues are often used to store data (e.g., data associated with transactions) while waiting for processing resources to become available or for particular events to occur. In some embodiments, queues are used to store transactions in program order even though the transactions may be performed out of program order. Thus, queues do not always behave in a first-in-first-out (FIFO) manner. For example, if transactions arrive out of program order but are removed in program order, the transactions may not be dequeued (or retired) in the same order in which they are enqueued. As used herein, the term "storage element" refers to any element configured to store one or more values in a volatile or non-volatile manner. Examples of storage elements include registers, memories, latches, disks, etc.

Tag arbiters 235A-D perform arbitration and then determine which transaction is ready to be sent to combined coherence point and memory cache controller units 250A-D, respectively, for processing. In one embodiment, each combined coherence point and memory cache controller unit 250A-D has a single pipeline that handles both coherence operations and a memory cache lookup. It is noted that combined coherence point and memory cache controller units 250A-D may also be referred to as combined coherence point and memory cache controller pipelines, or pipelines for short. In one embodiment, each tag arbiter 235A-D feeds into (i.e., supplies) a single pipeline 250A-D per memory channel. Also, each pipeline 250A-D feeds into a respective memory channel.

In one embodiment, pipeline 250A includes multiplexer 251A, data path 252A, tag pipeline 257A, and duplicate tags 258A. The other combined coherence point and memory cache controller units 250B-D have similar circuitry. Multiplexer 251A feeds data path 252A with data from a corresponding data buffer 230A-N once the pipeline has finished processing the transaction. Tag pipeline 257A includes circuitry for performing a lookup of the tags of memory cache 255A while duplicate tag pipeline 258A includes circuitry for performing a duplicate tag lookup for coherence purposes. Memory cache 255A stores recently accessed data from memory for a first memory channel, while duplicate tag pipeline 258A include tags, corresponding to the first memory channel, of cache lines stored in other caches of the computing system.

Figure 3:
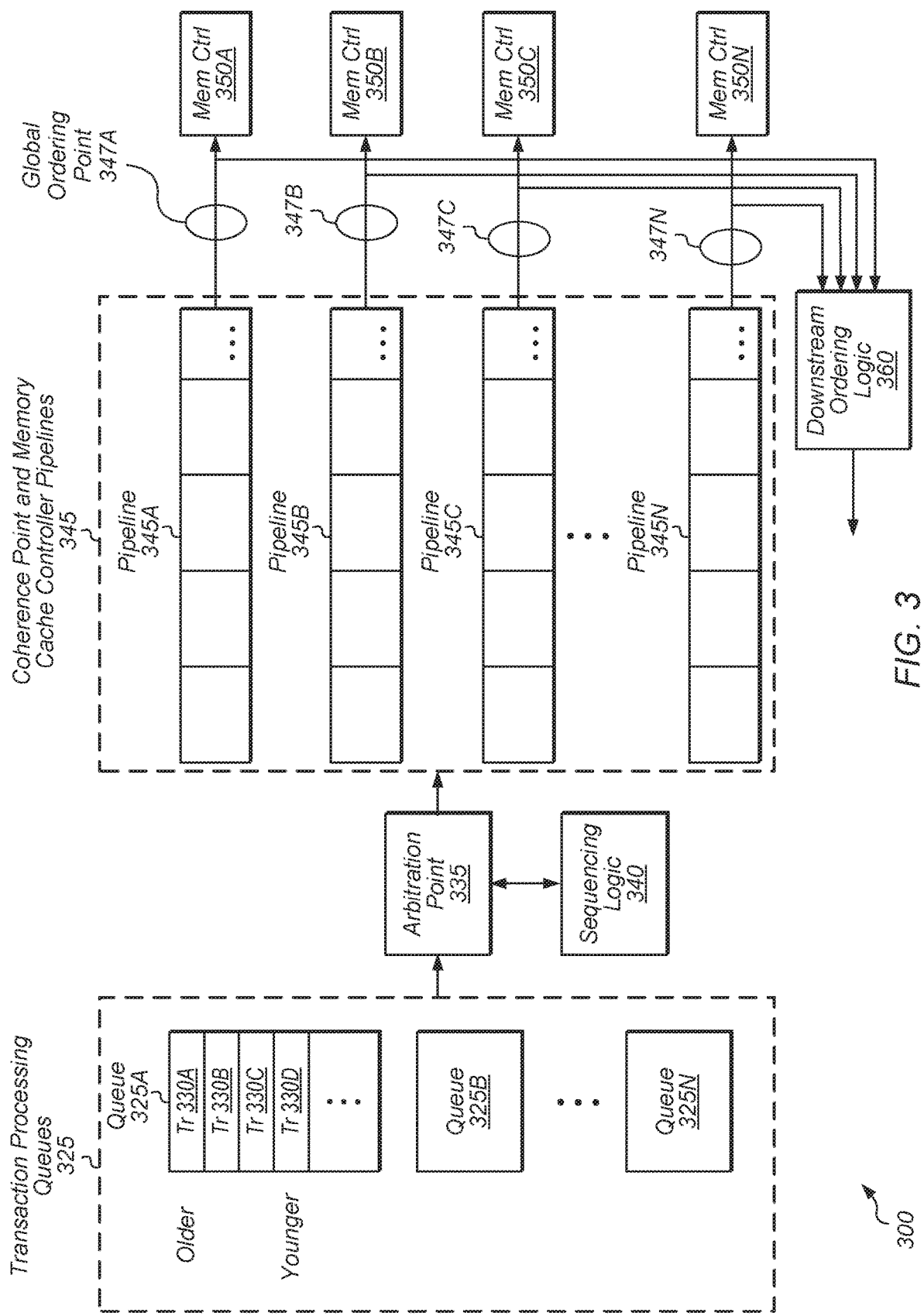
FIG. 3 is a block diagram of one embodiment of a communication fabric.

Referring now to FIG. 3, a block diagram of one embodiment of a communication fabric 300 is shown. In one embodiment, the communication fabric 300 includes at least transaction processing queues 325, arbitration point 335, sequencing logic 340, coherence point and memory cache controller pipelines 345A-N, and downstream ordering logic 360. The termination points of coherence point and memory cache controller pipelines 345A-N are referred to as distributed global ordering points 347A-N, respectively. Also, each coherence point and memory cache controller pipelines 345A-N supplies a corresponding memory controller 350A-N. It is noted that arbitration point 335 may also be referred to as an arbiter. It is also noted that coherence point and memory cache controller pipelines 345 may also be referred to as "coherence point pipelines", "coherence processing pipelines", or "pipelines", for short. In other embodiments, each coherence point and memory cache controller pipeline 345A-N may be split up into a separate coherence point pipeline and a separate memory cache controller pipeline. In various embodiments, the communication fabric 300 of FIG. 3 corresponds to fabric 110 (of FIG. 1), consolidated memory fabric 210 (of FIG. 2), or other fabrics within other types of systems.

In one embodiment, transactions are received by the communication fabric 300 and stored in transaction processing queues 325 to await selection by arbitration point 335. Any number and type of agents generate the transactions which are sent to and received by communication fabric 300. Transaction processing queues 325A-N are representative of any number and type of queues for storing in-flight transactions. At the point in time illustrated by FIG. 3, queue 325A stores transactions 330A-D. Queue 325A may also store any number of transactions. Transaction 330A is the oldest transaction while transaction 330D is the youngest transaction. It is noted that queues 325B-N may also store any number of transactions at the point in time represented by FIG. 3. Also, in other embodiments, transactions 330A-D may be stored in different queues rather than all being stored in the same queue 325A.

When arbitration point 335 selects a transaction for issuance to pipelines 345A-D, if the transaction meets certain criteria, then the transaction is assigned a sequence number by sequencing logic 340. In one embodiment, the transaction is assigned a sequence number by sequencing logic 340 if the transaction is a device-ordered transaction. In another embodiment, the transaction is assigned a sequence number by sequencing logic 340 if the address of the transaction falls within a particular range. In a further embodiment, the transaction is assigned a sequence number by sequencing logic 340 if the transaction targets a particular device. In other embodiments, the transaction is assigned a sequence number by sequencing logic 340 if two or more of these criteria are met and/or if other criteria are met.

When a transaction is assigned a sequence number by sequencing logic 340, the sequence number travels with the transaction through a corresponding pipeline 345 and through a corresponding global ordering point 347. Downstream ordering logic 360 uses the sequence numbers to enforce an ordering of transactions which are routed back through the fabric 300 in a downstream direction. In one embodiment, memory-bound transactions are issued to pipelines 345 based on a hashing of the address of the transaction. Non-memory-bound transactions are distributed across the pipelines 345 for load balancing purposes.

Figure 4:
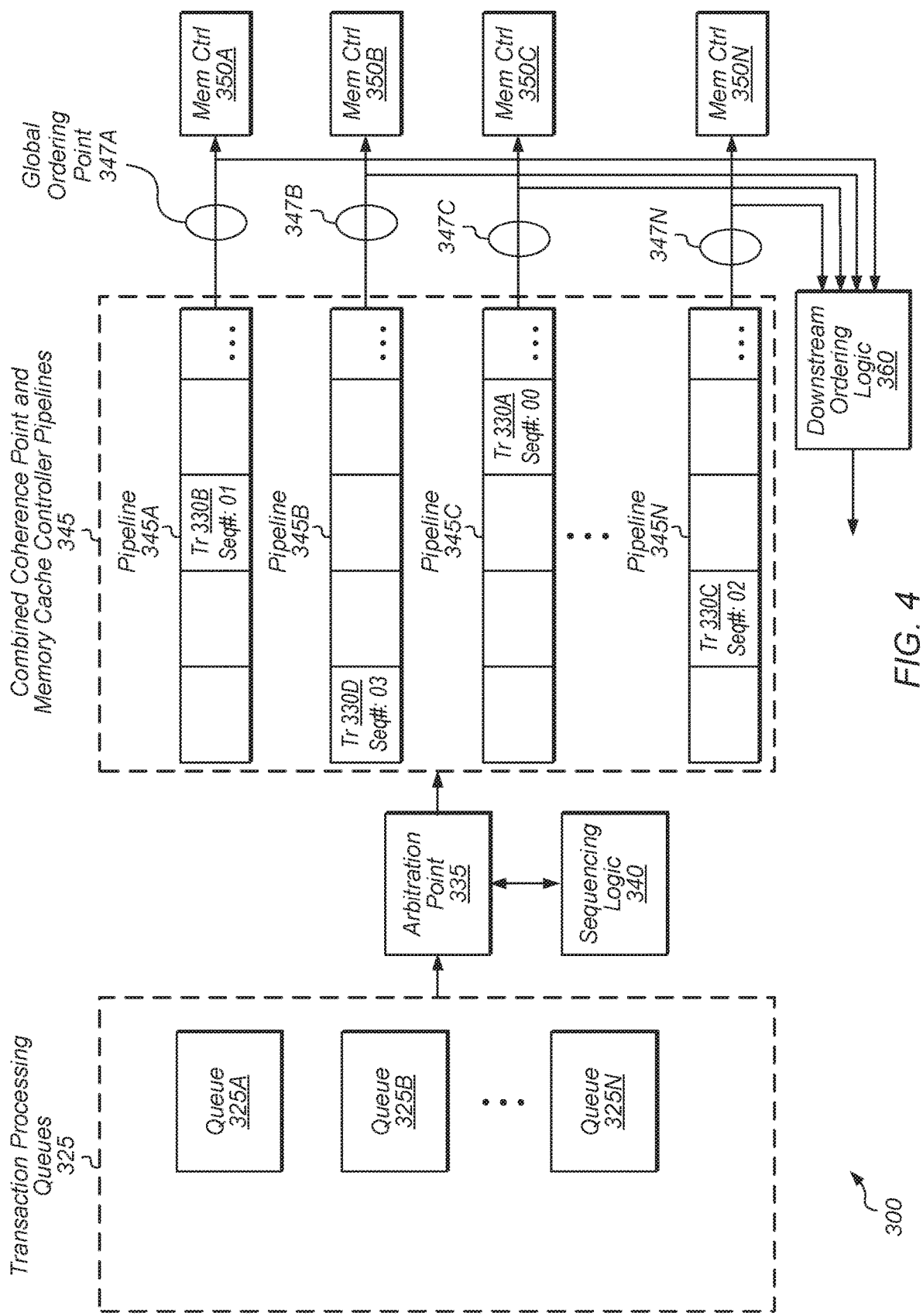
FIG. 4 is a block diagram of another embodiment of a communication fabric.

Turning now to FIG. 4, a block diagram of another embodiment of a communication fabric 300 is shown. The communication fabric 300 shown in FIG. 4 represents the same communication fabric 300 shown in FIG. 3 but at a later point in time. In between the point in time shown in FIG. 3 and the point in time shown in FIG. 4, transactions 330A-D have been selected out of queue 325A, transactions 330A-D have been assigned sequence numbers by sequencing logic 340, and transactions 330A-D have been issued to combined coherence point and memory cache controller pipelines 345. It is assumed for the purposes of this discussion that transactions 330A-D are device-ordered transactions. As shown in FIG. 4, transaction 330A has been assigned sequence number 00, transaction 330B has been assigned sequence number 01, transaction 330C has been assigned sequence number 02, and transaction 330D has been assigned sequence number 03. For the purposes of this discussion, it is assumed that transaction 330B is issued to pipeline 345A in a second clock cycle, transaction 330C is issued to pipeline 345N in a third clock cycle, and transaction 330D is issued to pipeline 345B in a fourth clock cycle. It is also assumed that the first, second, third, and fourth clock cycles are consecutive clock cycles, with the first clock cycle occurring prior to the second clock cycle, the second clock cycle occurring before the third clock cycle, and third clock cycle occurring before the fourth clock cycle.

After transaction 330A is issued to pipeline 345C in a first clock cycle, transactions 330B-D are speculatively issued to combined coherence point and memory cache controller pipelines 345 since they are subsequent to transaction 330A and since transaction 330A has not yet passed global ordering point 347C. If any issued transactions older than transaction 330A have not yet passed the global ordering point 347 when transaction 330A was issued, then transaction 330A may also be referred to as being speculatively issued. As used herein, the term "speculatively issued" is defined as issuing a given transaction to a coherence point pipeline before one or more older issued transaction(s) have passed a global ordering point 347. In other words, if any older transactions already issued to a coherence point pipeline have not yet passed a respective distributed global ordering point when a younger transaction is issued to a coherence point pipeline, the younger transaction has been "speculatively issued". One way to avoid speculatively issuing transactions to a coherent point pipeline is to wait until all older issued transactions have passed a respective distributed global ordering point. However, this approach would result in higher latency for transactions traversing fabric 300 and be detrimental from a performance point of view.

While the alignment of the four transactions 330A-D with respect to each other is shown as being preserved in the different pipelines 345A-D, it should be understood that this is shown merely for illustrative purposes to emphasize the timing of the issuance of transactions 330A-D to their respective pipelines 345A-D. However, the duration of processing encountered by transactions 330A-D in their respective pipelines 345A-D may vary widely, with one pipeline being relatively fast and another pipeline being relatively slow. Also, one transaction may require longer latency coherence operations while another transaction may pass through the coherence processing relatively quickly. Accordingly, the order in which transactions 330A-D exit pipelines 345A-D and pass through the distributed global ordering points 347A-D is not guaranteed to be the same as the order in which transactions 330A-D were issued to pipelines 345A-D. In cases where the ordering between transactions is disturbed by pipelines 345A-D, downstream ordering logic 360 will enforce an ordering of device-ordered transactions based on the sequence numbers assigned by sequencing logic 340. It is noted that downstream ordering logic 360 may also be referred to as "control logic" herein. In various embodiments, downstream ordering logic 360 includes one or more queuing structures and logic for selecting, for issuance downstream, transactions out of the queuing structure(s) in the proper order based on the sequence numbers of the transactions.

Figure 5:
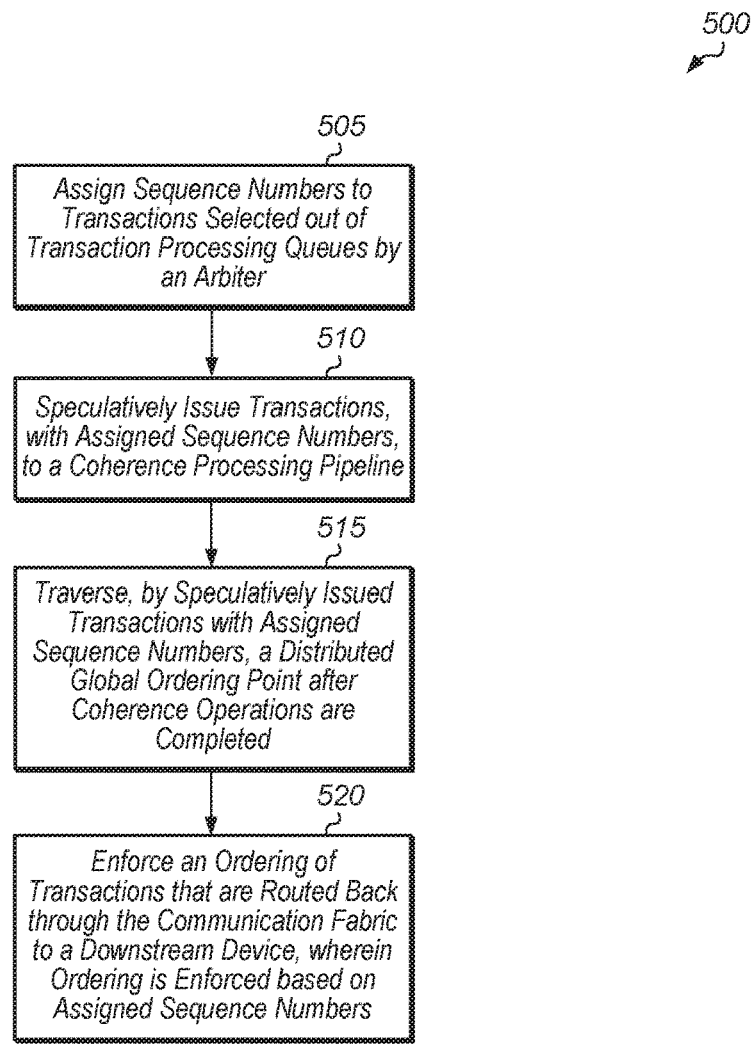
FIG. 5 is a generalized flow diagram illustrating one embodiment of a method for implementing a distributed global ordering point.

Referring now to FIG. 5, one embodiment of a method 500 for implementing a distributed global ordering point is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein or any of various other types of devices may be configured to implement method 500.

Sequencing logic of a communication fabric assigns sequence numbers to transactions selected out of transaction processing queues by an arbiter (block 505). It is noted that when transactions are sent by various agents to the communication fabric, the transactions do not yet have sequence numbers. In one embodiment, the sequencing logic of the communication fabric only assigns sequence numbers to device-ordered transactions. In another embodiment, the sequencing logic of the communication fabric assigns sequence numbers to all transactions. In other embodiments, the sequencing logic of the communication fabric determines whether to assign a sequence number to a given transaction based on one or more other factors.

Figure 6:
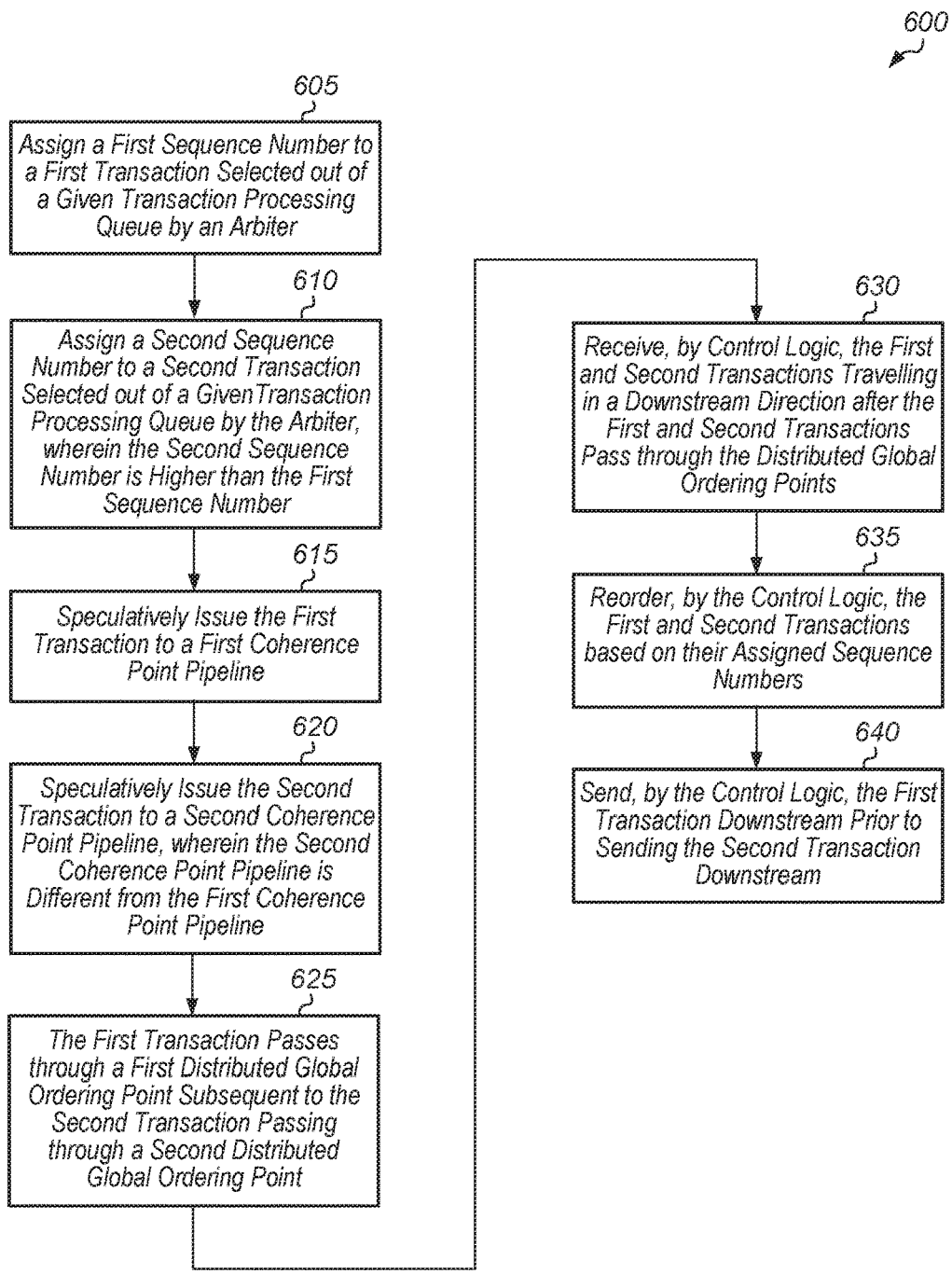
FIG. 6 is a generalized flow diagram illustrating another embodiment of a method for implementing a distributed global ordering point.

Next, an arbiter of the communication fabric speculatively issues transactions, with assigned sequence numbers, to a coherence processing pipeline (block 510). In one embodiment, the coherence processing pipeline includes circuitry for performing a duplicate tag lookup and circuitry for performing coherence operations if the duplicate tag lookup is a hit. In some embodiments, the coherence processing pipeline also includes circuitry for performing a memory cache lookup. Then, the speculatively issued transactions, with assigned sequence numbers, traverse a distributed global ordering point after coherence operations are completed (block 515). Next, control logic in the communication fabric enforces an ordering of transactions that are routed back through the communication fabric to a downstream device, wherein ordering is enforced based on assigned sequence numbers (block 520). After block 520, method 500 ends. It is noted that transactions sent to the downstream device from the communication fabric travel in an opposite direction as compared to transactions sent to memory from the communication fabric Turning now to FIG. 6, another embodiment of a method 600 for implementing a distributed global ordering point is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein or any of various other types of devices may be configured to implement method 600.

Sequencing logic assigns a first sequence number to a first transaction selected out of a given transaction processing queue by an arbiter (block 605). Next, sequencing logic assigns a second sequence number to a second transaction selected out of a given transaction processing queue by the arbiter, wherein the second sequence number is higher than (i.e., subsequent to) the first sequence number (block 610). In other words, the second transaction is younger than the first transaction.

Next, the arbiter speculatively issues the first transaction to a first coherence point pipeline (block 615). Then, the arbiter speculatively issues the second transaction to a second combined coherence point pipeline, wherein the second coherence point pipeline is different from the first coherence point pipeline (block 620). Next, the first transaction passes through a first distributed global ordering point subsequent to the second transaction passing through a second distributed global ordering point (block 625). Control logic receives the first and second transactions travelling in a downstream direction after the first and second transactions pass through the distributed global ordering points (block 630). The control logic reorders the first transaction and second transaction based on their assigned sequence numbers (block 635). Consequently, the control logic sends the first transaction downstream prior to sending the second transaction downstream (block 640). After block 640, method 600 ends.

Figure 7:
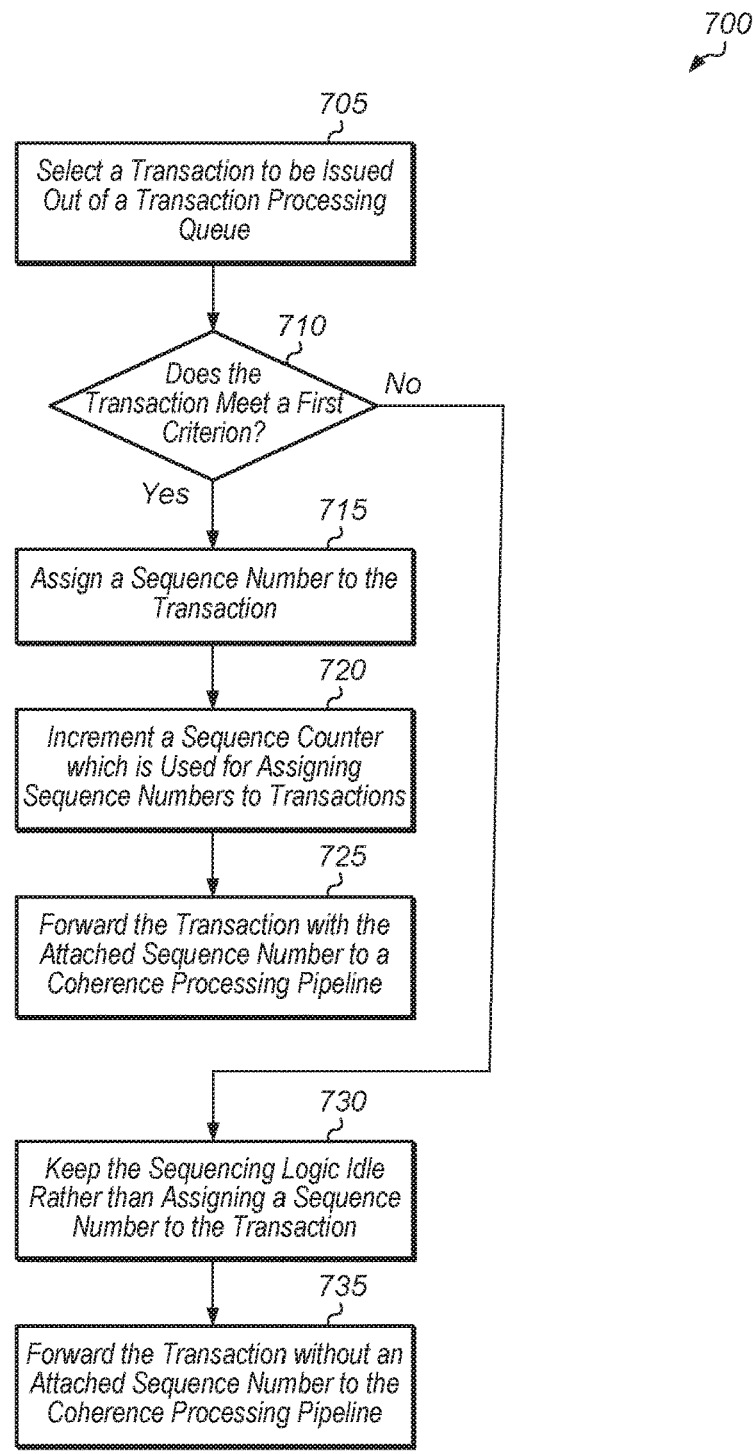
FIG. 7 is a generalized flow diagram illustrating one embodiment of a method for determining whether to assign a sequence number to a transaction.

Referring now to FIG. 7, one embodiment of a method 700 for determining whether to assign a sequence number to a transaction is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein or any of various other types of devices may be configured to implement method 700.

An arbiter selects a transaction to be issued out of a transaction processing queue (block 705). In response to the arbiter selecting the transaction, a communication fabric determines if the transaction meets a first criterion (conditional block 710). In one embodiment, the first criterion is the transaction being device-ordered. In other embodiments, the first criterion is any of various other types of criteria.

If the transaction meets the first criterion (conditional block 710, "yes" leg), then sequencing logic assigns a sequence number to the transaction (block 715). Next, the sequencing logic increments a sequence counter which is used for assigning sequence numbers to transactions (block 720). Also, the transaction with the attached sequence number is forwarded to a coherence processing pipeline (block 725). After block 725, method 700 ends. It is noted that the attached sequence number may be used to ensure a proper ordering of the transaction as the transaction travels back through the fabric in a downstream direction toward its target location.

If the transaction does not meet the first criterion (conditional block 710, "no" leg), then sequencing logic remains idle rather than assigning a sequence number to the transaction (block 730). Next, the transaction without an attached sequence number is forwarded to the coherence processing pipeline (block 735). After block 735, method 700 ends.

Figure 8:
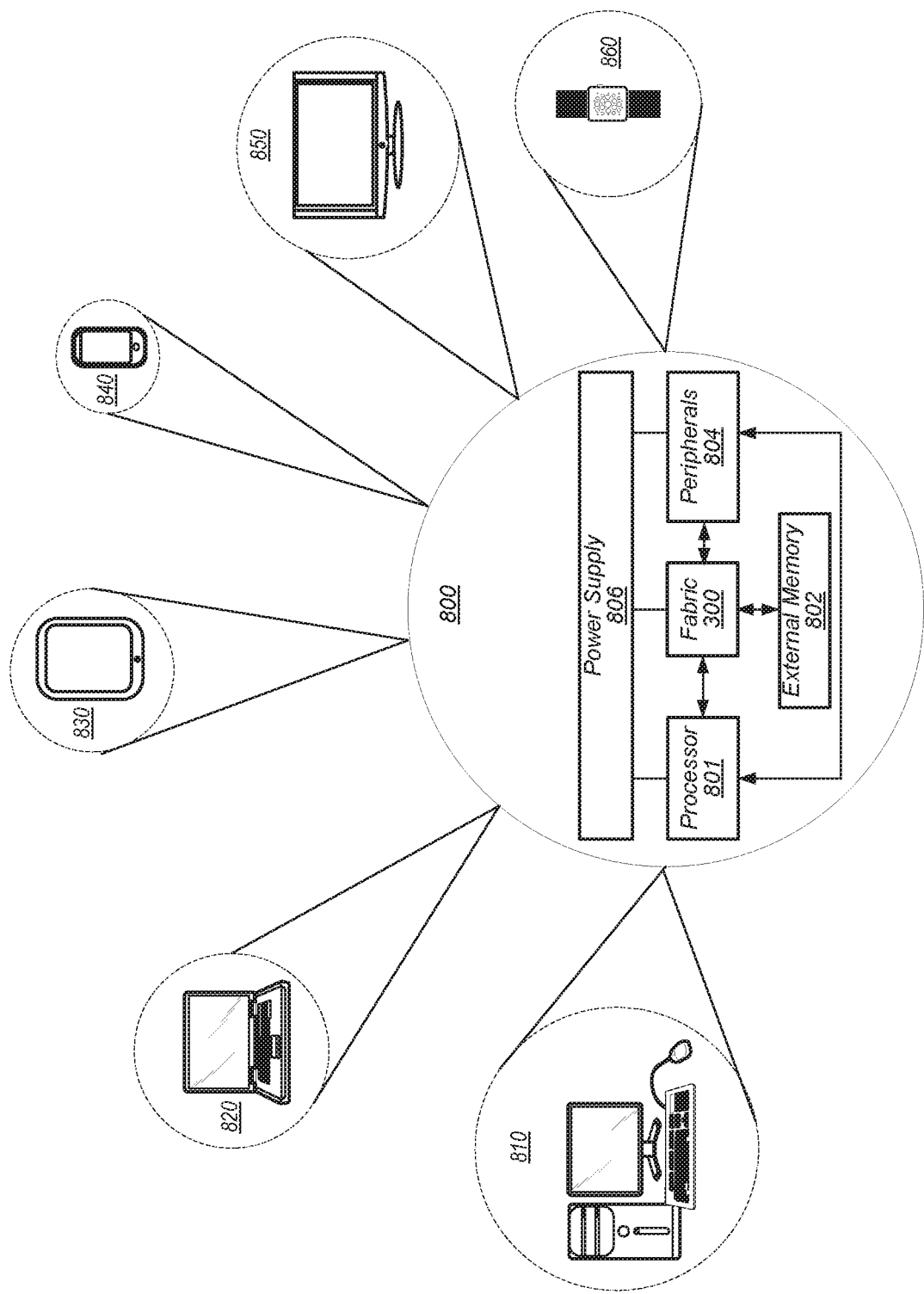
FIG. 8 is a block diagram of one embodiment of a system.

Turning next to FIG. 8, a block diagram of one embodiment of a system 800 is shown. As shown, system 800 may represent chip, circuitry, components, etc., of a desktop computer 810, laptop computer 820, tablet computer 830, cell or mobile phone 840, television 850 (or set top box configured to be coupled to a television), wrist watch or other wearable item 860, or otherwise. Other devices are possible and are contemplated. In the illustrated embodiment, the system 800 includes at least one instance of communication fabric 300 (of FIG. 3). In various embodiments, fabric 300 may be included within a system on chip (SoC) or integrated circuit (IC) which is coupled to processor 801, external memory 802, peripherals 804, and power supply 806.

Fabric 300 is coupled to processor 801, one or more peripherals 804, and the external memory 802. A power supply 806 is also provided which supplies the supply voltages to fabric 300 as well as one or more supply voltages to the processor 801, memory 802, and/or the peripherals 804. In various embodiments, power supply 806 may represent a battery (e.g., a rechargeable battery in a smart phone, laptop or tablet computer). In some embodiments, more than one instance of fabric 300 may be included (and more than one processor 801 and/or external memory 802 may be included as well).

The memory 802 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an SoC or IC containing fabric 300 in a chip-on-chip configuration, a package-on-package configuration, or a multi-chip module configuration.

The peripherals 804 may include any desired circuitry, depending on the type of system 800. For example, in one embodiment, peripherals 804 may include devices for various types of wireless communication, such as wifi, Bluetooth, cellular, global positioning system, etc. The peripherals 804 may also include additional storage, including RAM storage, solid state storage, or disk storage. The peripherals 804 may include user interface devices such as a display screen, including touch display screens or multi-touch display screens, keyboard or other input devices, microphones, speakers, etc.

Figure 9:
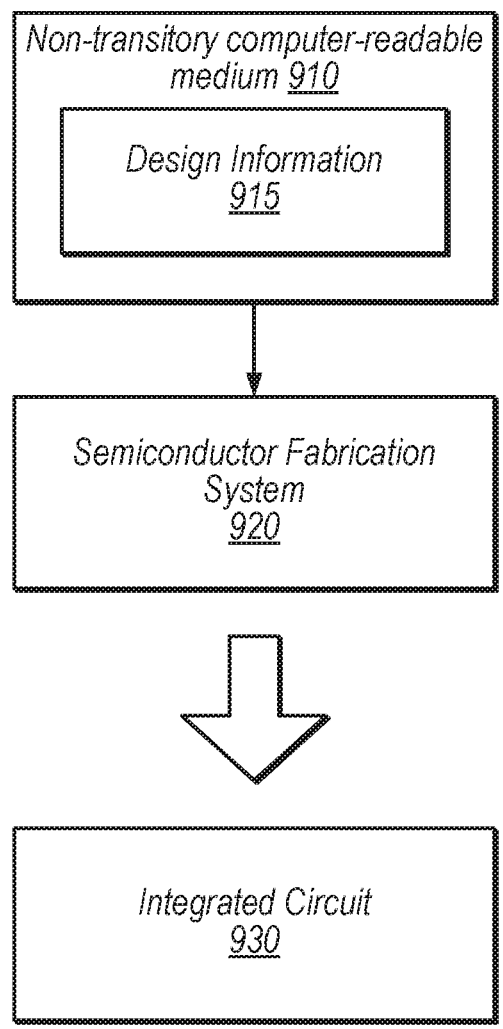
FIG. 9 is a block diagram illustrating an exemplary non-transitory computer-readable storage medium that stores circuit design information.

Referring now to FIG. 9, a block diagram illustrating an exemplary non-transitory computer-readable storage medium that stores circuit design information is shown. In the illustrated embodiment, semiconductor fabrication system 920 is configured to process the design information 915 stored on non-transitory computer-readable medium 910 and fabricate integrated circuit 930 based on the design information 915.

Non-transitory computer-readable medium 910 may comprise any of various appropriate types of memory devices or storage devices. Medium 910 may be an installation medium, (e.g., a CD-ROM, floppy disks, or tape device) a computer system memory or random access memory (e.g., DRAM, DDR RAM, SRAM, EDO RAM, Rambus RAM), a non-volatile memory (e.g., a Flash, magnetic media, a hard drive, optical storage), registers, or other similar types of memory elements. Medium 910 may include other types of non-transitory memory as well or combinations thereof. Medium 910 may include two or more memory mediums which may reside in different locations (e.g., in different computer systems that are connected over a network).

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries which specify the synthesis and/or layout of integrated circuit 930.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIGS. 1-4. Furthermore, integrated circuit 930 may be configured to perform various functions described herein in conjunction with other components. For example, integrated circuit 930 may be coupled to voltage supply circuitry that is configured to provide a supply voltage (e.g., as opposed to including a voltage supply itself). Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In various embodiments, program instructions of a software application are used to implement the methods and/or mechanisms described herein. For example, program instructions executable by a general or special purpose processor are contemplated. In various embodiments, such program instructions are represented by a high level programming language. In other embodiments, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of embodiments. Numerous variations and modifications will become apparent to those skilled in the art once the above disclosure is fully appreciated. It is intended that the following claims be interpreted to embrace all such variations and modifications.

What is claimed is:

1. A computing system comprising:
   a plurality of coherence point pipelines; and
   a communication fabric coupled to the plurality of coherence point pipelines, wherein the communication fabric is configured to:
      assign sequence numbers to transactions selected out of one or more transaction processing queues;
      speculatively issue transactions, with assigned sequence numbers, upstream to the plurality of coherence point pipelines; and
      enforce ordering of transactions that are routed downstream back through the communication fabric to a downstream device, wherein ordering is enforced based on assigned sequence numbers.

2. The computing system as recited in claim 1, wherein the communication fabric is further configured to:
   assign a first sequence number to a first transaction selected out of one of the one or more transaction processing queues;
   assign a second sequence number to a second transaction selected out of one of the one or more transaction processing queues, wherein the second sequence number is higher than the first sequence number;
   speculatively issue the first transaction to a first coherence point pipeline;
   speculatively issue the second transaction to a second coherence point pipeline, wherein the second coherence point pipeline is different from the first coherence point pipeline; and
   send the first transaction downstream prior to the second transaction responsive to comparing the first sequence number to the second sequence number.

3. The computing system as recited in claim 2, wherein the first transaction passes through a first distributed global ordering point prior to the second transaction passing through a second distributed global ordering point.

4. The computing system as recited in claim 3, wherein the first distributed global ordering point is located at an end of the first coherence point pipeline, and wherein the second distributed global ordering point is located at an end of the second coherence point pipeline.

5. The computing system as recited in claim 1, wherein the communication fabric is configured to assign sequence numbers to transactions which meet a first criterion.

6. The computing system as recited in claim 5, wherein the first criterion is a transaction being a device-ordered transaction.

7. The computing system as recited in claim 1, wherein transactions sent to the downstream device from the communication fabric travel in an opposite direction from transactions sent to memory from the communication fabric.

8. A method comprising:
   assigning, by a communication fabric, sequence numbers to transactions selected out of one or more transaction processing queues;
   speculatively issuing transactions, with assigned sequence numbers, upstream to a plurality of coherence point pipelines; and
   enforcing ordering of transactions that are routed downstream back through the communication fabric to a downstream device, wherein ordering is enforced based on assigned sequence numbers.

9. The method as recited in claim 8, further comprising:
   assigning a first sequence number to a first transaction selected out of one of the one or more transaction processing queues;

assigning a second sequence number to a second transaction selected out of one of the one or more transaction processing queues, wherein the second sequence number is higher than the first sequence number;

speculatively issuing the first transaction to a first coherence point pipeline;

speculatively issuing the second transaction to a second coherence point pipeline, wherein the second coherence point pipeline is different from the first coherence point pipeline; and ensuring that the first transaction is sent downstream prior to the second transaction by comparing the first sequence number to the second sequence number.

10. The method as recited in claim 9, wherein the first transaction passes through a first distributed global ordering point prior to the second transaction passing through a second distributed global ordering point.

11. The method as recited in claim 10, wherein the first distributed global ordering point is located at an end of the first coherence point pipeline, and wherein the second distributed global ordering point is located at an end of the second coherence point pipeline.

12. The method as recited in claim 8, further comprising assign sequence numbers to transactions which meet a first criterion.

13. The method as recited in claim 12, wherein the first criterion is a transaction being a device-ordered transaction.

14. The method as recited in claim 8, wherein transactions sent to the downstream device from the communication fabric travel in an opposite direction from transactions sent to memory from the communication fabric.

15. An apparatus comprising:
one or more processing units;
one or more memory controllers; and
a communication fabric coupled to the one or more processing units and the one or more memory controllers, wherein the communication fabric is configured to:
assign sequence numbers to transactions selected out of one or more transaction processing queues;
speculatively issue transactions, with assigned sequence numbers, upstream to a plurality of coherence point pipelines; and
enforce ordering of transactions that are routed downstream back through the communication fabric to a downstream device, wherein ordering is enforced based on assigned sequence numbers.

16. The apparatus as recited in claim 15, wherein the communication fabric is further configured to:
assign a first sequence number to a first transaction selected out of one of the one or more transaction processing queues;
assign a second sequence number to a second transaction selected out of one of the one or more transaction processing queues, wherein the second sequence number is higher than the first sequence number;
speculatively issue the first transaction to a first coherence point pipeline;
speculatively issue the second transaction to a second coherence point pipeline, wherein the second coherence point pipeline is different from the first coherence point pipeline; and
ensure that the first transaction is sent downstream prior to the second transaction by comparing the first sequence number to the second sequence number.

17. The apparatus as recited in claim 16, wherein the first transaction passes through a first distributed global ordering point prior to the second transaction passing through a second distributed global ordering point.

18. The apparatus as recited in claim 17, wherein the first distributed global ordering point is located at an end of the first coherence point pipeline, and wherein the second distributed global ordering point is located at an end of the second coherence point pipeline.

19. The apparatus as recited in claim 15, wherein the communication fabric is configured to assign sequence numbers to transactions which meet a first criterion.

20. The apparatus as recited in claim 19, wherein the first criterion is a transaction being a device-ordered transaction.

* * * * *